H. C. Milligan,
Spoon.
No. 104,051. Patented June 7, 1870.

Witnesses:
A. Bennewendorf
Alex. F. Roberts

Inventor:
H. C. Milligan
PER 
Attorneys.

UNITED STATES PATENT OFFICE.

HENRY C. MILLIGAN, OF BROOKLYN, NEW YORK.

IMPROVEMENT IN HANDLES OF SHEET-METAL SPOONS, FORKS, &c.

Specification forming part of Letters Patent No. 104,051, dated June 7, 1870.

*To all whom it may concern:*

Be it known that I, HENRY C. MILLIGAN, of Brooklyn, in the county of Kings and State of New York, have invented a new and useful Improvement in Handles for Sheet-Metal Spoons, Forks, &c.; and I do hereby declare that the following is a full, clear, and exact description thereof, which will enable others skilled in the art to make and use the same, reference being had to the accompanying drawing forming part of this specification.

This invention relates to improvements in the construction of the handles of spoons, forks, and other implements made of sheet metal, or handles only made of sheet metal, and consists in making them with oblique corrugations stamped into them on one side, and raised on the other, between the edges, which are left plain for a narrow space, the said corrugations being made for strengthening and ornamenting the handles, and, in the case of spoons, designed to produce a sufficiently strong handle from the thinnest sheet metal of which the bowl may be made.

Figure 1:
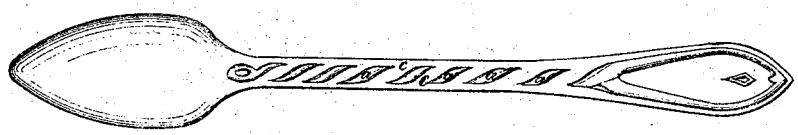
Figure 2:
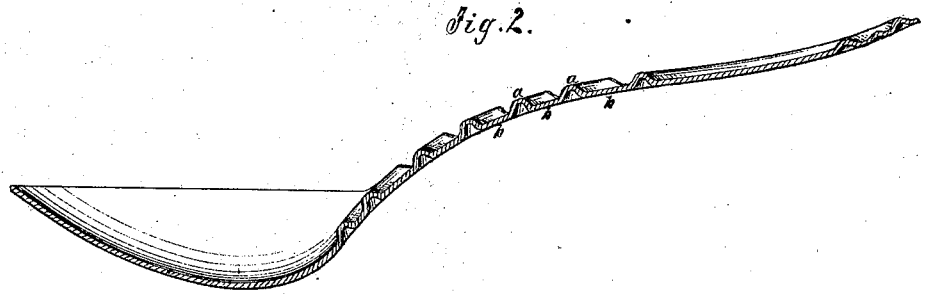
Figure 2:
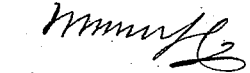

Figure 1 is a plan view of a spoon, the handle of which is made according to my improvement, and Figure 2 is a sectional elevation of the same.

Similar letters of reference indicate corresponding parts.

In this example the corrugations $a$ are raised to the upper side by being stamped up from the under side in the suitable shape, but it is obvious that they may be raised on the other side.

The said corrugations or ribs are designed to lap each other about half their length, so that a cut in cross-section at any point will intersect two of the ribs. Between each rib is a plain surface, $b$, and there is a plain margin, $c$, on each side, between the ends of the corrugations and the edges. The said corrugations may be extended into the bowl of the spoon, to the point where the plate widens, sufficiently to give the requisite strength.

It is believed that these oblique ribs, with plain parts between, strengthen the handles much more than the longitudinal ribs do. They also make a more ornamental spoon.

I am aware that spoons have been made with strengthening ribs raised in the handles, parallel with the edges, and I do not, therefore, claim strengthening the handles with corrugations or ribs formed thereon; but What I do claim as new, and desire to secure by Letters Patent, is—

A handle for sheet-metal spoons, forks, &c., corrugated in lines oblique to its length and overlapping each other, so that a transverse section will cut two corrugations, as set forth.

The above specification of my invention signed by me this 7th day of March, 1870.

HENRY C. MILLIGAN.

Witnesses:
GEO. W. MABEE,
ALEX. F. ROBERTS.